US006277226B1

(12) United States Patent
Schulz

(10) Patent No.: US 6,277,226 B1
(45) Date of Patent: Aug. 21, 2001

(54) METHOD OF PROCESSING LAMINATED EMBOSSED WEBS HAVING EQUAL EMBOSSED DEFINITION

(75) Inventor: Galyn Schulz, Greenville, WI (US)

(73) Assignee: Fort James Corporation, Deerfield, IL (US)

(*) Notice: Subject to any disclaimer, the term of this patent is extended or adjusted under 35 U.S.C. 154(b) by 614 days.

(21) Appl. No.: 08/619,806

(22) Filed: Mar. 20, 1996

(51) Int. Cl.[7] .............................. B32B 31/08; B32B 31/12

(52) U.S. Cl. ............................ 156/209; 156/292; 156/553

(58) Field of Search ..................................... 156/209, 553, 156/205, 210, 291, 292

(56) References Cited

U.S. PATENT DOCUMENTS

| | | | | |
|---|---|---|---|---|
| 3,738,905 | | 6/1973 | Thomas | 156/205 |
| 3,867,225 | | 2/1975 | Nystrand | 156/209 |
| 3,953,638 | | 4/1976 | Kemp . | |
| 4,127,637 | | 11/1978 | Pietreniak et al. | 156/209 |
| 4,211,743 | | 7/1980 | Nauta et al. | 264/284 |
| 4,260,443 | | 4/1981 | Lindsay et al. | 156/290 |
| 4,307,141 | | 12/1981 | Walbrum | 156/209 |
| 4,320,162 | | 3/1982 | Schulz | 156/209 |
| 4,325,768 | | 4/1982 | Schulz | 156/209 |
| 4,376,671 | * | 3/1983 | Schulz | 156/553 |
| 4,469,735 | | 9/1984 | Trokhan | 428/154 |
| 4,483,728 | | 11/1984 | Bauernfeind | 156/209 |
| 4,978,565 | * | 12/1990 | Pigneul et al. | 156/209 |
| 5,116,548 | | 5/1992 | Mallik et al. . | |
| 5,215,617 | | 6/1993 | Grupe | 156/209 |
| 5,269,983 | * | 12/1993 | Schulz | 162/117 |
| 5,443,889 | * | 8/1995 | Ruppel et al. | 156/209 |

* cited by examiner

*Primary Examiner*—Steven D. Maki
(74) *Attorney, Agent, or Firm*—Nixon Peabody LLP; Donald R. Studebaker

(57) ABSTRACT

A method of forming a multi-ply web by embossing a first ply between a first pair of matched embossing rolls including a first embossing roll having protuberances formed in a substantially rigid outer surface and a second embossing roll having protuberances formed of a resilient material thereby forming raised portions and recessed portions in the first ply, embossing a second ply between a second pair of matched embossing rolls including a third roll having protuberances formed in an outer surface formed of a resilient material and a fourth roll having protuberances formed in a substantially rigid outer surface thereby forming raised portions and recessed portions in the second ply with the first and second pairs of matched embossing rolls being positioned such that the first embossing roll is positioned adjacent the third embossing roll forming a nip region between the respective protuberances formed in each roll. An first adhesive is then applied to the web carried by the third adhesive roll with the first ply and second ply being adhered to one another in the nip region wherein the raised portions of the first and second plies are adhered to one another and the recessed portions of the first and second plies are spaced from one another.

14 Claims, 3 Drawing Sheets

METHOD OF PROCESSING LAMINATED EMBOSSED WEBS HAVING EQUAL EMBOSSED DEFINITION

TECHNICAL FIELD OF THE INVENTION

The present invention is directed to a method for producing lamented embossed webs and more particularly to a method of producing two-ply point-to-point embossed webs with equal embossed definition on both sides.

BACKGROUND OF THE INVENTION

Multiple ply lamented embossed paper products are typically of two types, "nested" and "pillowed", each of which have substantially greater bulk than non-embossed multiple ply products. When a tissue or towel sheet is provided with an embossed pattern, projecting raised areas and recessed areas are produced corresponding to the protuberances and recessed areas of the embossing rolls. A "nested" product results when projecting raised areas of a first web are aligned with the recessed areas between two raised areas of a second web, whereas a "pillowed" sheet results when projecting raised areas of both first and second webs are placed adjacent one another with the recessed areas of the two sheets creating a relatively large void between adjacent raised areas.

The primary problem associated with multi-ply embossed paper webs is that, traditionally, the plies have been combined at the nip between the steel embossing rolls. This metal-to-metal contact at the embossing roll nip has resulted in excess wear of the embossing rolls requiring frequent and costly repair or replacement of the rolls. This problem was recognized in U.S. Pat. No. 3,867,225 issued to Nystrand wherein the plies are combined between one of the steel embossing rolls and a rubber-covered "marrying roll" which permits the nip between the two embossing rolls to be run open, thereby reducing wear on and extending greatly the useful life of the embossing rolls.

However, the process set forth in the above-noted patent to Nystrand, is useful only for producing a "nested" type product since the solid surface marrying roll would substantially debulk a pillowed product. A pillowed multi-ply product is shown in U.S. Pat. No. 3,738,905 issued to Thomas, however, this method suffers from the aforementioned embossing roll wear problem at the combiner nip. A solid surface marrying roll, as disclosed in the Nystrand patent utilized with this process would result in approximately fifty percent of the lamented bulk sheet being removed during the embossing stage.

In an effort to overcome the aforementioned shortcomings, a relief pattern marrying roll is set forth in U.S. Pat. No. 4,483,728 issued to Bauernfeind wherein a marrying roll especially adapted to combine multiple plies of a tissue sheet at a nip between the marrying roll and an embossing roll is set forth. The marrying roll is provided with a pattern of raised lamented elements covering a predetermined percentage of the marrying roll surface which are caused to bear against the raised embossing elements of an embossing roll with the plies of a pillowed tissue sheet therebetween. The pattern of raised elements on the marrying roll surface may be in the form of dots, a rectangular grid pattern, or any other pattern of choice. The pattern is preferably aligned at an angle to the machine direction to eliminate bunching or puckering of the tissue sheet between pattern elements. During the manufacture of the multi-ply web, adhesive is applied to the projecting raised areas of one of the plies; however, the embossed webs are related with one another but not joined at an open nip between the embossing rollers in that the adhesive which has been applied is insufficient to laminate the webs together because the nip between the embossing rolls is run in the open position to prevent embossing roll damage often experienced in such systems. It is the marrying roll which presses the plies together to adhered such plies to one another which forms the two-ply web. In this regard, the embossing rolls are inadequate to adhere the single ply webs to one another and the use of marrying roll results in a decrease in the lamented sheet bulk.

U.S. Pat. No. 5,215,617 issued to Grupe sets forth yet another method of forming multi-ply webs wherein matched rubber and embossing rolls are used to reduce strength degradation of the ply during embossing and to permit the use of rotogravure adhesive printing when forming nested webs. That is, matched embossing roll pairs are used to emboss separate paper plies which are subsequently adhered to one another by adjacent rolls of each of the pair of embossing rolls. When forming the nested ply, one of the embossing rolls includes a rubber covered roll having embossing elements which permits the use of rotogravure adhesive printing. However, this reference fails to recognize the formation of a pillow type multi-ply web wherein the plies are adhered to one another at the nip formed between adjacent embossing rolls. Further, applying the adhesive to the raised portions of the soft rubber roll may result in a reduction in the effectiveness of the spot bonding between plies which results in stiffening of the two-ply web.

Therefore, there is a need for an embossing roll arrangement which will permit the embossing of pillowed type multi-ply webs without debulking the web in any manner. Moreover, there is the need for a method of producing a multi-ply soft absorbent web while eliminating the use of a marrying roll which inherently reduces the overall bulk of the multi-ply web. Moreover, there is a need for a method of forming pillow type multi-ply webs having equal emboss definition on both sides thereof and which is not unduly stiffened by the application of adhesives.

SUMMARY OF THE INVENTION

A primary object of the present invention is to overcome the aforementioned shortcomings associated with the prior art methods discussed hereinabove.

A further object of the present invention is to provide a method for forming a pillow type multi-ply web having equal emboss definition on both sides.

Yet another object of the present invention is to provide a method of forming a pillow type multi-ply web wherein the bulk density of the web is not destroyed by the adhesion of the webs to one another.

A further object of the present invention is to provide a method of forming a multi-ply web wherein the bulk density and definition of the web is enhanced.

Yet another object of the present invention is to provide a multi-ply web wherein sheets stiffness due to the adhesion of the webs to one another is reduced.

A still further object of the present invention is to provide a multi-ply web wherein the sheets of the multi-ply web are selectively adhered to one another so as to limit the application of adhesive to the plies so as to not unduly stiffen the multi-ply web.

These, as well as additional objects of the present invention, are achieved by forming a multi-ply web by embossing a first ply between a first pair of matched embossing rolls including a first embossing roll having protuberances formed in a substantially rigid outer surface and a second embossing roll having protuberances formed of a resilient material thereby forming raised portions and recessed portions in the first ply, embossing a second ply between a second pair of matched embossing rolls including a third roll have protuberances formed in an outer surface formed of a resilient material and a fourth roll having protuberances formed in a substantially rigid outer surface thereby forming raised portions and recessed portions in the second ply with the first and second pairs of matched embossing rolls being positioned such that the first embossing roll is positioned adjacent the third embossing roll forming a nip region between the protuberances formed in each roll. An adhesive is applied to the web carried by the first roll with the first ply and second ply being adhered to one another in the nip region wherein the raised portions of the first and second plies are adhered to one another and the recessed portions of the first and second plies are spaced from one another. Such a multi-ply web may also be formed by separately embossing first and second plies with a pattern of raised portions and recessed portions, applying adhesive to at least some of the raised portions of one of the first and second plies and passing each of the plies through a nip formed between a first roll having a resilient outer surface and a second roll having a substantially rigid outer surface wherein the raised portions of the first and second plies are adhered to one another and the recessed portions of the first and second plies are spaced from one another.

Alternativly, the above noted advantages may be achieved by forming a multi-ply web by embossing a first ply between a first pair of matched embossing rolls including a first embossing roll having protuberances formed in a substantially rigid outer surface and a second embossing roll having protuberances formed of a resilient material thereby forming raised portions and recessed portions in the first ply, embossing a second ply between a second pair of matched embossing rolls including a third roll have protuberances formed in an outer surface formed of a resilient material and a fourth roll having protuberances formed in a substantially rigid outer surface thereby forming raised portions and recessed portions in the second ply with the first and second pairs of matched embossing rolls being positioned such that the second embossing roll is positioned adjacent the third embossing roll forming a nip region between the protuberances formed in each roll. An adhesive is applied to the web carried by the first roll with the first ply and second ply being adhered to one another in the nip region wherein the raised portions of the first and second plies are adhered to one another and the recessed portions of the first and second plies are spaced from one another.

Further, in order to decrease the stiffness of the multi-ply web, adhesive can preferably be applied by way of a printing plate and reverse enclosed doctor blade so as to apply the adhesive in selected locations thereby minimizing the amount of adhesive applied. In doing so, the amount of adhesive build up on the embossing rolls is minimized and allows the embossing rolls to clean themselves.

These, as well as additional advantages of the present invention will become apparent from the following detailed description of the invention when read in light of the several figures.

DETAILED DESCRIPTION OF THE INVENTION

Figure 1:
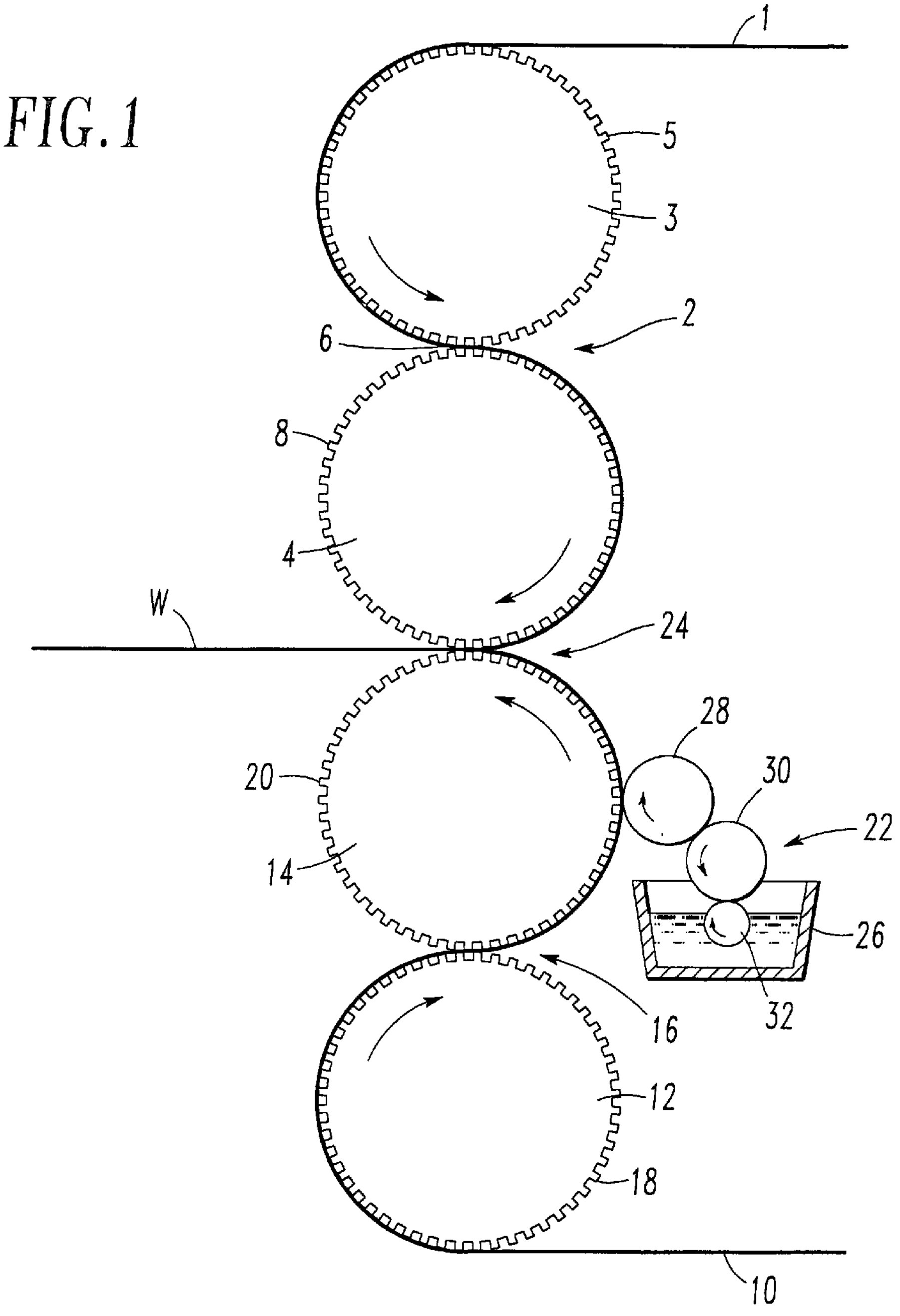
FIG. 1 is a schematic diagram of the method of forming a multi-ply web in accordance with the present invention.

Referring now to FIG. 1, the device for carrying out the method in accordance with the present invention will be discussed in detail. In accordance with the present invention, a first ply 1 of tissue paper or the like is embossed by a first matched embossing roll pair 2. The first matched embossing roll pair 2 consists of a first matched embossing roll 3 and a second matched embossing roll 4. The first roll 3 is formed of steel and includes embossing elements or protuberances 5 formed therein. The particular cooperation between the first and second embossing rolls can be such that either of such rolls may be of the male roll or female roll so long as the web 1 passing through the nip 6 formed between the embossing roll pair 2 is properly embossed. Embossing roll 4 which mates with the embossing roll 3 is a steel roll having a rubber laser-engraved outer surface. That is, a surface of the roll 4 is of a resilient material including laser-engraved embosses or protuberances 8 such that the web 1 undergoes a male to female fully intermeshing embossing step between the engraved steel roll 3 and the mating laser-engraved rubber roll 4. The laser engraved rubber roll 4 should be soft enough such that during the embossing of the web 1, the thin sheet material is not damaged, but hard enough to sufficiently emboss the web. Accordingly, it has been determined that the rubber surface of the laser engraved rubber embossing roll should have a durometer hardness in the range of 70 to 110 and preferable approximately 99. The particular laser engraved rubber roll utilized in accordance with the present invention may be of the type disclosed in U.S. Pat. No. 5,269,983 and assigned to the assignee of the subject application, the contents of which are hereby incorporated herein by reference.

Similarly, the second web 10 undergoes an embossing process similar to that of web 1 wherein a first laser-engraved rubber surfaced embossing roll 12 mates with an engraved steel roll 14 forming a nip region 16 therebetween. In this regard, the embossing elements or protuberances 18 of the roll 12 and the embossing elements or protuberances 20 of the roll 14 intermesh with one another to form the desired pattern in the web 10. As with the laser engraved rubber roll 4, roll 12 includes a rubber surface which is laser engraved in the manner discussed hereinabove. The rubber surface of roll 12 is similarly of a durometer hardness in the range of 70 to 110 and preferably approximately 99.

An adhesive is applied in any known manner to the raised portions of the web 10 as the web is carried by the roll 14. That is, the adhesive is applied to the web which is passing over the steel roll 14. While the adhesive is illustrated as being applied to the web entrained by roll 14, the adhesive may alternatively be applied to the web entrained by roll 4. As illustrated, a flexographic type applicator generally indicated at 22 applies an adhesive to the raised portions on the web 10. The amount of adhesive applied to the web 10 is sufficient to laminate the webs 1 and 10 together as they pass through the nip 24 formed between the laser-engraved rubber roll 4 and the engraved steel roll 14. The adhesive, which may be contained in a reservoir 26 is supplied to the applicator roll 28 by way of transfer rolls 30 and 32. The adhesive is applied in an amount sufficient to adhere the webs 1 and 10 together in the manner illustrated in FIG. 2. However, such adhesive is not applied in an amount greater than necessary which would result in a unnecessary stiffening of the resultant web material W.

The laser engraved rubber embossing roll 4 and the engraved steel roll 14 are preferably engraved with substantially the same pattern thereby forming web W having equal emboss definition on both sides. In order to further accomplish the accurate mating of the raised portions of the webs 1 and 10, the rolls 4 and 14 are preferably of substantially the same diameter and driven at substantially the same speed. This will ensure the proper mating of the protuberances 8 and 20 of the rolls 4 and 14, respectively. While it is preferred that the rolls 4 and 14 be of substantially the same diameter and driven at substantially the same speed, this need not be the case so long as the protuberances 8 and 20 align at the nip region 24.

Further, while rolls 3 and 12 are referred to as female embossing rolls and rolls 4 and 14 are referred to as male embossing rolls, the respective rolls may take on either configuration so long as rolls 3 and 4 intermesh to properly emboss web 1; rolls 12 and 14 intermesh to properly emboss web 10 and rolls 4 and 14 cooperate to properly adhere webs 1 and 10 to one another to form web W. Moreover, because the rolls 4 and 12 are of a resilient material, the webs 1 and 10 can be heavily embossed, in that sharp edges associated with highly machined steel rolls are not present, thereby the web material is not damaged resulting in a web having higher resultant bulk density.

Figure 2:
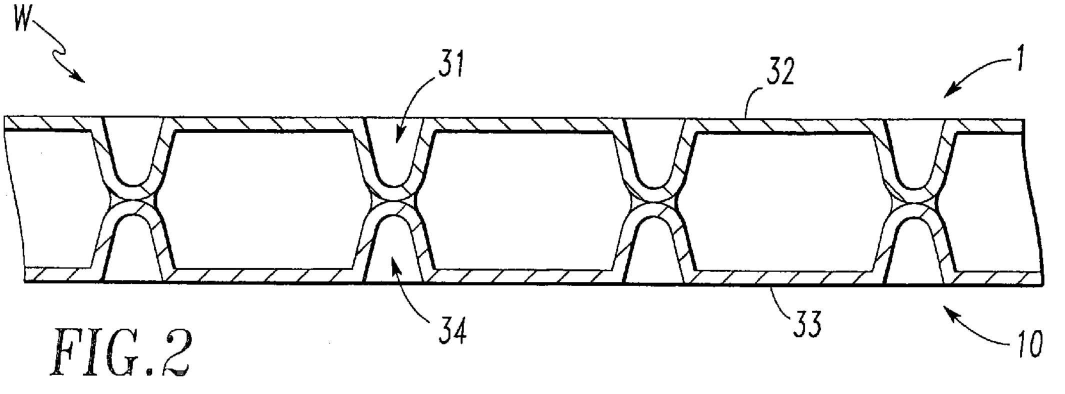
FIG. 2 is a cross-sectional view of a "pillow" type multi-ply web formed in accordance with the present invention.

Referring now to FIG. 2, the resultant web W which is obtained by passing independent single ply webs 1 and 10 through the above-noted embossing process includes raised portions 31 and 34 in each of the webs 1 and 10, respectively, as well as recessed portions 32 and 33 in each of the webs 1 and 10, respectively. Because the adhesive is applied by the applicator 28 to the raised portion 34 of the single ply web 10, the raised portions 31 and 34 adhere to one another while the recessed portions 32 and 33 remain spaced from one another resulting in a significant bulk density. As discussed hereinabove, the independent single ply webs 1 and 10 are joined at the nip 24 between the engraved steel roll 14 which is run point-to-point with the laser-engraved rubber roll 4. By applying adhesive only to the highest raised portions 34 of the single ply web 10 passing over the engraved steel roll 14, spot bonding joins the two-plies without unduly stiffening the sheet. In this regard, the use of a marrying roll is eliminated such that the full emboss applied to each of the single ply webs 1 and 10 is retained. Further, the full bulk and full definition of the emboss applied to each of the single ply webs 1 and 10 is retained thereby forming a multi-ply web having equal emboss definition on both sides.

By applying adhesive by the applicator 28 only to the highest tips of the raised portions 34 of the single ply web 10 passing over the steel roll 14 glue build up which often leads to failure of the points with prior art processes is significantly reduced. Further, in accordance with the present invention, by utilizing a steel roll running against a laser engraved rubber roll, there is less heat generated at the nip region 24, and less pressure is required between the rolls in order to sufficiently bond the single ply webs 1 and 10 to form the multi-ply web W. This results in a multi-ply web wherein the bulk density of the web is not destroyed by the adhesion of the webs to one another. Moreover, because less pressure is required at the nip region 24, and there is no steel-to-steel contact between the laser engraved rubber roll 4 and the engraved steel roll 14, the life of the rolls is greatly increased thereby reducing the frequency of costly repairs.

Figure 3:
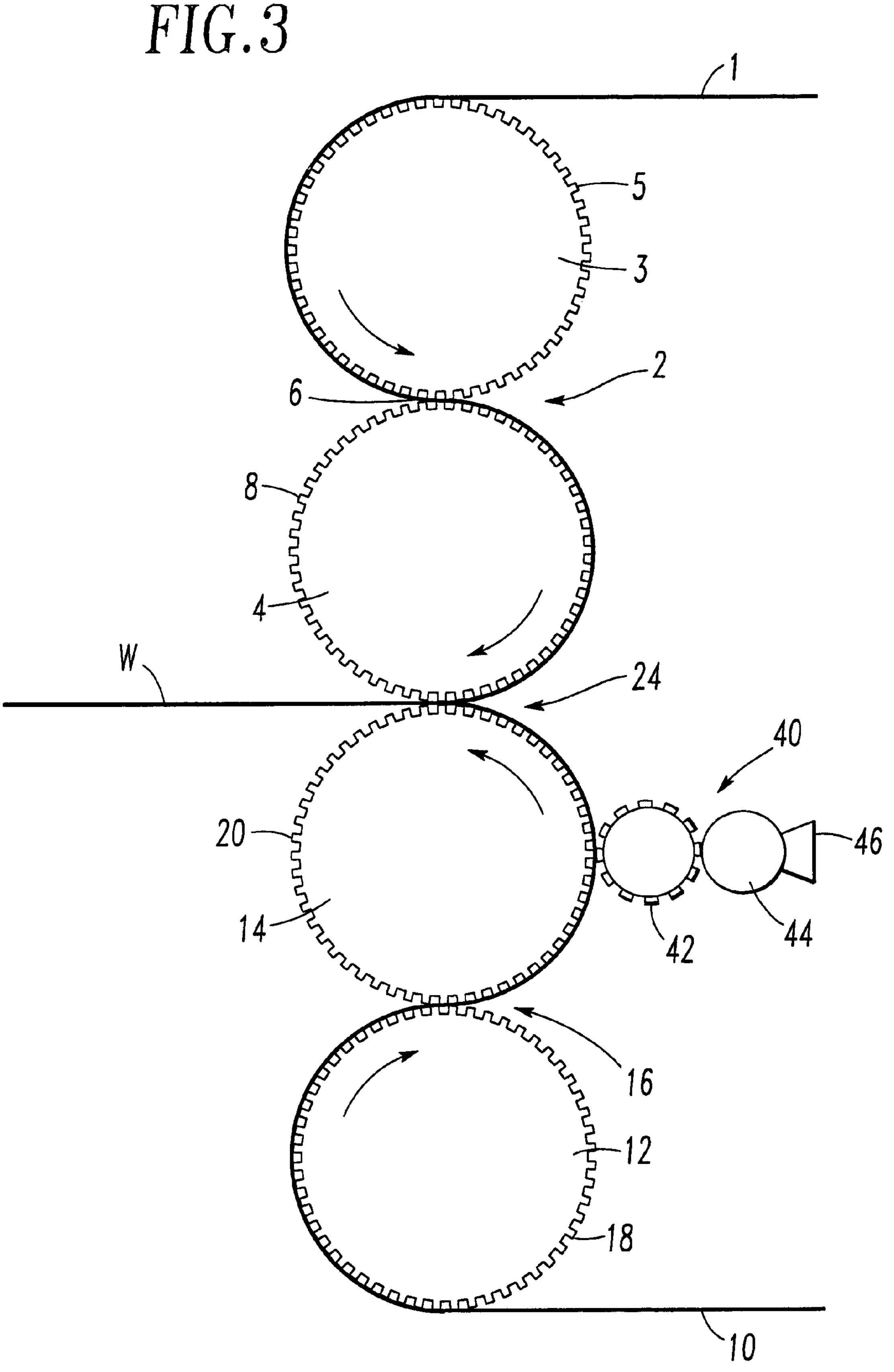
FIG. 3 is a schematic diagram of the method of forming a multi-ply web in accordance with the present invention including a preferred adhesive application process.

Preferably, in accordance with the present invention, adhesive is to be applied to the web encircling the engraved steel roll 14 and in a selective manner. This is preferably accomplished by providing an adhesive application system 40 as illustrated in FIG. 3.

As in the previous embodiment illustrated in FIG. 1, a first ply 1 of tissue paper or the like is embossed by a first matched pair of embossing rolls 2. The first matched pair of embossing rolls 2 consist of a first matched embossing roll 3 and a second matched embossing roll 4. The first roll 3 is formed of steel and includes embossing elements or protuberances 5 formed therein. The particular cooperation between the first and second embossing rolls can be such that either of such rolls may be made of the male roll or female roll so long as the web 1 passing through the nip 6 formed between the embossing roll pair 2 is properly embossed. Embossing roll 4 which mates with embossing roll 3 is preferably a steel roll having a rubber laser engraved outer surface. That is, as with the previous embodiment, the surface of the roll 4 is a resilient material including laser engraved embosses or protuberances 8 such that the web 1 undergoes a male to female fully intermeshed embossing step between the engraved steel roll and the mating laser engraved rubber roll.

Similarly, the second web 10 undergoes an embossing process similar to that of web 1 wherein a first laser engraved rubber surface embossing roll 12 mates with an engraved steel roll 14 forming a nip region 16 therebetween. In this regard, the embossing elements or protuberances 18 of the roll 12 and the embossing elements or protuberances 20 of the roll 14 intermesh with one another to form the desired pattern in the web 10. As with the laser engraved rubber roll 4, roll 12 includes a rubber surface which is laser engraved in the manner discussed hereinabove with respect to FIG. 1.

Again, as with the previous embodiment, an adhesive is applied to the web 10 as it is carried by the roll 14. In this regard, adhesive is applied to the web 10 in a selective manner by the adhesive application device 40. This device includes a printing plate roll 42, an analox roll 44 and a reverse angle doctor blade unit 46 combined to provide a light or sparse amount of adhesive to the web 10 entrained by the roll 14. It should be noted that the printing plate roll 42 can be of any configuration and may be readily changed in order to apply adhesive only to selected regions of the web 10 entrained by the roll 14. Further, while the embodiment illustrated in FIG. 3 shows the printing roll 42 adjacent the steel roll 14, the printing roll may likewise be positioned adjacent the rubber roll 4 and apply adhesive to the web 1 entrained by the roll 4.

Regardless of which web carrying roll the adhesive is applied, by using the configuration illustrated in FIG. 3, the printing plate will only apply adhesive at selected locations thus allowing the backup roll, that is the roll 4 or 14 to clean itself prior to having adhesive applied to the same area a second time. This results in a decrease in the amount of adhesive build up in the nip region, a decrease in vibration previously encountered in similar systems and thus an increase in productivity.

It is noted that while the adhesive application unit 40 is illustrated as being used in conjunction with the particular embossing process illustrated in FIG. 3, such an adhesive unit may be used in any process where a selective amount of adhesive is to be applied to selective portions of a web in the manner discussed hereinabove.

Figure 4:
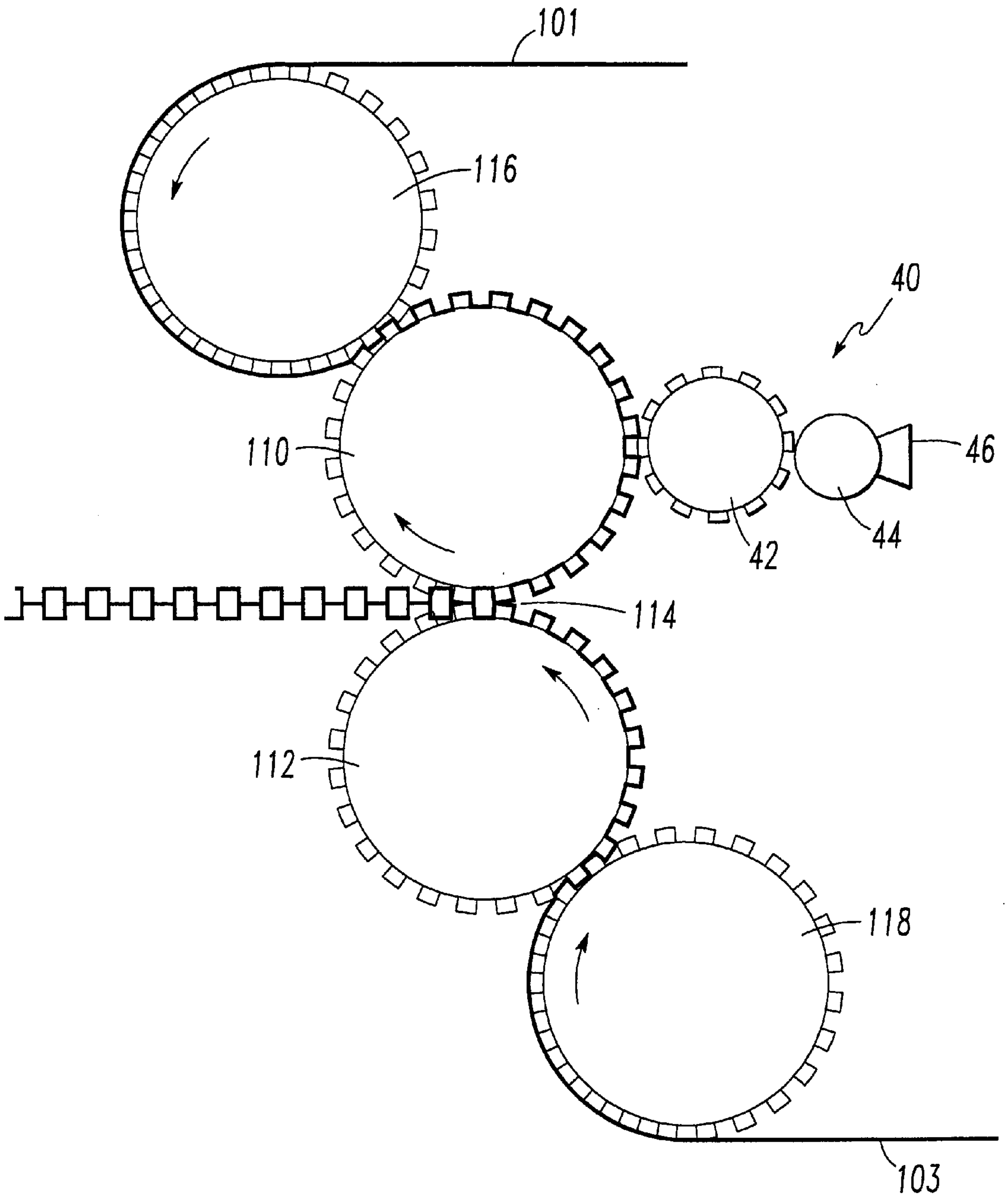
FIG. 4 is a schematic diagram of the method of forming a multi-ply web in accordance with an alternative embodiment of the present invention.

With reference now to FIG. 4, an alternative embodiment of the present invention will be described in detail.

Unlike the previous embodiment, the embodiment illustrated in FIG. 4 includes mating rubber rolls 110 and 112 which combine to form a nip region 114 therebetween. Each of the rubber rolls 110 and 112 are laser engraved embossing rolls similar to rolls 4 and 12 as discussed in detail hereinabove. As with the previous embodiment, it has been determined that the surface of the laser engraved rubber embossing roll should have a durometer hardness in the range of 70 to 110 and preferably approximately 99. By positioning the laser engraved rubber rolls adjacent to one another forming the nip region 114, rather than adhering the embossed regions of the paper plies to one another, the process reverses the emboss to deboss and bonds the two plies together in the nip between the rubber rolls. In this regard, the outer rolls 116 and 118 which initially entrain webs 101 and 103, respectively, cooperate with rolls 110 and 112 to form the desired pattern in the web. As with the previous embodiment, an adhesive application device 40 which includes a printing plate roll 42, an analox roll 44 and a reverse doctor blade 46 is provided in order to supply adhesive to selective portions of at least one of the webs entrained by the rolls. In this regard, the paper web is debossed with the debossments being adhered to one another in the nip region 114. In doing so, a majority of the fibers are aligned thereby creating a thicker more substantial base. Further, by changing the depth of the debossed pattern, improved absorbency can be achieved. Moreover, by increasing the depth of the debossed pattern to a depth which would fracture the fibers would even further increase the absorbency of the paper product.

Additionally, the forgoing may be modified such that all rolls of the device are rubber rolls having engraved patterns thereon or the outer rolls may simply be resilient backup rolls which permit the pattern of the harder rubber roll to emboss the wed material against the smooth resilient surface.

Accordingly, by manufacturing the multi-ply web W in accordance with the process set forth hereinabove, an easy to run point-to-point mating of the single ply webs is achieved which enhances bulk and definition of the multi-ply web. Further, a two-ply point-to-point embossed sheet having equal embossed definition on both sides is achieved while retaining the pliability of the sheet as well as the full bulk and definition thereof.

While the present invention has been described with reference to a preferred embodiment, it will be appreciated by those skilled in the art that the invention may be practiced otherwise than as specifically described here and without departing from the spirit and scope of the invention. It is, therefore, be understood that the spirit and scope of the invention be limited only by the appended claims.

We claim:

1. A method of producing a multi-ply web comprising the steps of:

embossing a first ply between a first pair of matched embossing rolls including a first embossing roll having protuberances formed in a substantially rigid outer surface and a second embossing roll having protuberances formed in an outer surface formed of a resilient material thereby forming raised portions and recessed portions in said first ply;

embossing a second ply between a second pair of matched embossing rolls including a third roll having protuberances formed in an outer surface formed of a resilient material and a fourth roll having protuberances formed in a substantially rigid outer surface thereby forming raised portions and recessed portions in said second ply;

positioning said first and second pairs of matched embossing rolls such that said first embossing roll is positioned adjacent said third embossing roll forming a nip region between the protuberances formed in each roll;

applying an adhesive to the web carried by said first embossing roll; and adhering said first ply and said second ply to one another in said nip region;

wherein at least a position of said raised portions of said first and second plies are adhered to one another and said recessed portions of said first and second plies are spaced from one another.

2. The method as defined in claim 1, wherein said first and fourth embossing rolls are formed of steel.

3. The method as defined in claim 1, wherein said second and third embossing rolls are steel rolls having a rubber outer surface secured to the steel roll.

4. The method as defined in claim 3, wherein said rubber outer surface is engraved by a laser to form said protuberances therein.

5. The method as defined in claim 3, wherein said rubber outer surface has a durometer hardness in the range of 70 to 110.

6. The method as defined in claim 3, wherein said rubber outer surface has a durometer hardness of approximately 99.

7. The method as defined in claim 1, wherein each of said first and third embossing rolls are of a predetermined diameter and driven at a predetermined speed such that successive protuberances formed in said first roll and successive protuberances formed in said third roll substantially mate with one another at said nip region.

8. A method for embossing a two ply tissue wherein sides of the two ply tissue have equal emboss definition said method comprising:

providing a first roll having a substantially rigid outer surface, said outer surface having a plurality of protuberances thereon corresponding to a predetermined emboss pattern, and providing a second roll having an outer surface formed of resilient material, and removing selected portions of the resilient material from the outer surface of the second roll to form recessed portions for receiving the protuberances of the first roll; and providing a third roll having an outer surface formed of a resilient material, said outer surface having a plurality of protuberances thereon corresponding to a predetermined emboss pattern, and providing a fourth roll having an outer surface formed of rigid material and removing selected portions of the rigid material from the outer surface of the fourth roll to form recessed portions for receiving the protuberances of the third roll;

placing the first and second roll and the third and fourth roll in contact to form a nip between the rolls, with protuberances of the first roll entering the recessed portions of the second roll and with protuberances of the third roll entering the recessed portions of the fourth roll;

passing a single ply web between the nip formed between each pair of rolls forming two embossed plies;

joining the two embossed plies at a nip between the protuberances of the first roll and the protuberances of the third roll by applying adhesive to at least a portion of protuberances formed in the web formed on the first roll and passing the two embossed plies through the nip, point-to-point with the protuberances of the first and third roll and recovering a two ply tissue without destroying a full emboss applied to each ply.

9. The method as defined in claim 8, wherein said first and fourth embossing rolls are formed of steel.

10. The method as defined in claim 8, wherein said second and third embossing rolls are steel rolls having a rubber outer surface secured to the steel roll.

11. The method as defined in claim 10, wherein said rubber outer surface is engraved by a laser to form said protuberances of said third embossing roll and said recessed portions of said second embossing roll.

12. The method as defined in claim 10, wherein said rubber outer surface has a durometer hardness in the range of 70 to 110.

13. The method as defined in claim 12, wherein said rubber outer surface has a durometer hardness of approximately 99.

14. The method as defined in claim 8, wherein each of said first and third embossing rolls are of a predetermined diameter and driven at a predetermined speed such that successive protuberances formed in said first roll and successive protuberances formed in said second roll substantially mate with one another at said nip regions.

* * * * *